United States Patent [19]

Katritzky et al.

[11] Patent Number: 4,740,568

[45] Date of Patent: Apr. 26, 1988

[54] TRIAZOLINETHIONE-CONTAINING POLYMER

[75] Inventors: Alan R. Katritzky; Stephen J. Cato, both of Gainesville, Fla.; Jerald K. Rasmussen, Stillwater, Minn.; Larry R. Krepski, White Bear Lake, Minn.; Steven M. Heilmann, N. St. Paul, Minn.

[73] Assignee: Minnesota Mining and Manufacturing Company, St. Paul, Minn.

[21] Appl. No.: 891,858

[22] Filed: Sep. 3, 1986

Related U.S. Application Data

[62] Division of Ser. No. 721,317, Apr. 9, 1985, Pat. No. 4,624,995.

[51] Int. Cl.$^4$ ............................................. C08G 73/08
[52] U.S. Cl. .................... 525/452; 525/417; 525/418; 525/419; 525/535; 525/540; 528/44; 528/67; 528/68; 528/73; 528/120; 528/271; 528/363; 528/364
[58] Field of Search ............... 525/452, 417, 418, 419, 525/535, 540; 528/67, 68, 73, 120, 271, 363, 364, 44

[56] References Cited

U.S. PATENT DOCUMENTS

| | | | |
|---|---|---|---|
| 3,307,944 | 3/1967 | Weyde et al. | 96/29 |
| 3,615,522 | 10/1971 | Obl et al. | 96/66 |
| 3,647,451 | 3/1972 | Kdwig et al. | 96/52 |
| 3,718,468 | 2/1973 | Berthold et al. | 96/50 |
| 3,832,186 | 8/1974 | Masuda et al. | 96/114.1 |
| 4,624,995 | 11/1986 | Katritzky et al. | 525/418 |

OTHER PUBLICATIONS

Simionescu et al., Acta Chim. Acad. Sci. Hung., 86, 459 (1975).
Chem. Abstr., 84, 44710v (1976).
Chem. Abstr., 94, 104319t (1981).
Derwent 43394 D/24 AE (1980).
M. I. Shtil'man et al., Polymer Sci. USSR, 10, 2827 (1969).

*Primary Examiner*—Harold D. Anderson
*Attorney, Agent, or Firm*—Donald M. Sell; James A. Smith; Lorraine R. Sherman

[57] ABSTRACT

A poly(triazolinethione) is prepared by a process comprising the steps:
(a) providing a poly(acylthiosemicarbazide),
(b) cyclodehydrating the poly(acylthiosemicarbazide) by subjecting it to an elevated temperature in the presence of an aqueous alkaline solution to form a polyanion of a poly(triazolinethione),
(c) treating the polyanion of the poly(triazolinethione) with aqueous acid solution to provide the poly(triazolinethione), and
(d) isolating the resulting poly(triazolinethione).

11 Claims, No Drawings

TRIAZOLINETHIONE-CONTAINING POLYMER

This is a division of application Ser. No. 721,317, filed Apr. 9, 1985, now U.S. Pat. No. 4,624,995.

FIELD OF THE INVENTION

This invention relates to a novel process for preparing polymers containing the [2H]-1,2,4-triazoline-3-thione ring system. In another aspect, it relates to polymers prepared by the process of the invention. The polymers are useful as non-migratable species in photographic constructions.

BACKGROUND OF THE INVENTION

Photographic elements are often composed of many layers of photosensitive and non-photosensitive materials, with each layer making a unique contribution to achieve a high degree of image quality. In color photography especially, the number of emulsion-applied layers is often considerable, with, in addition to one or more layers being deposited to define the proper level for each of the primary colors, layers being present that are responsible for performing antihalation, filtering, barrier, antistatic, and antiblocking functions. These layers function more or less independently, and it is important that the various components of the layers not migrate into neighboring layers. If migration occurs, the loss of the component not only diminishes overall performance of the function for which it was added, but the migrated component also can interfere with the function of neighboring layers into which it has migrated. Migration is a serious problem in photography, and various means have been adopted to eliminate it. One means that has been utilized is to attach the migratable components in a layer to a relatively non-migratable species such as an organic polymer.

The [2H]-1,2,4-triazoline-3-thione (hereinafter referred to as triazolinethione)heterocycle, shown along with its tautomeric form (often referred to as mercapto triazole) in equation (1), is extremely useful in the photographic industry.

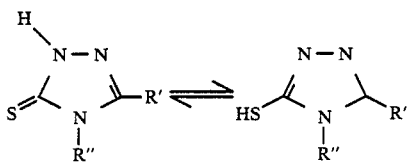

For example, low molecular weight triazolinethione compounds have been utilized to enhance the contrast of images in silver photography (U.S. Pat. No. 3,307,944); as agents to inhibit overdevelopment of the outermost layer of a silver halide multilayer color construction (U.S. Pat. No. 3,615,522); as anti-bronzing agents to maintain a high degree of image intensity and contrast (U.S. Pat. No. 3,647,451); as stabilizers for developed images (U.S. Pat. No. 3,718,468); and as photosensitive agents for maintaining image contrast (U.S. Pat. No. 3,832,186). All these utilizations have involved relatively migratable, low molecular weight, i.e., of 200 or less, compounds.

In two instances the triazolinethione heterocycle has been incorporated into monomers which then undergo polymerization to afford heterocyclic polymers. An isopropenyl-functional monomer 1 (as described by Cr. Simionescu, et al., *Acta Chim. Acad. Sci. Hung.*, 86, 459 (1975); *Chem. Abstr.*, 84, 44710v (1976)) was free-radically polymerized; the purpose of forming the polymer was not divulged.

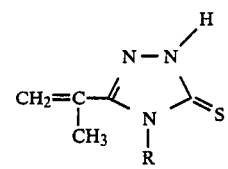

Bis(epoxide) monomer 2 was also disclosed (O. P. Shvaika, et al., USSR 765,267 (1978); *Chem. Abstr.*, 94, 104319t (1981)) for use in epoxy resins to reduce the self-hardening temperature.

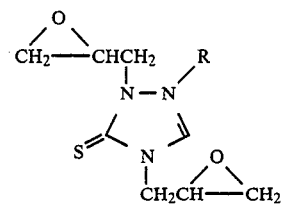

In a third instance, M. I. Shtil'man, et al., *Polymer Sci. USSR*, 10, 2827 (1969), disclose a solventless, thermal cyclodehydration of one particular poly(actylthiosemicarbazide) 3 to form a poly([2H]-1,2,4-triazoline-3-thione) 4 according to equation (2).

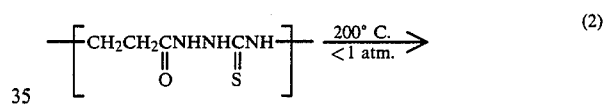

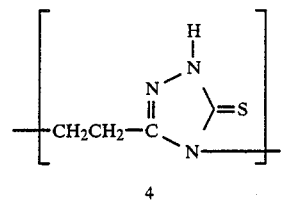

We have examined the above cyclodehydration with other poly(acylthiosemicarbazides), however, and have found that often crosslinked poly(triazolinethiones) which are insoluble and intractable are the result.

SUMMARY OF THE INVENTION

Briefly, the present invention provides a process for preparing a poly(triazolinethione) compound comprising the steps:
 (a) providing a poly(acylthiosemicarbazide),
 (b) cyclodehydrating the poly(acylthiosemicarbazide) by subjecting it to an elevated temperature in the presence of an aqueous alkaline solution to form a polyanion of the poly(triazolinethione),
 (c) treating the polyanion of the poly(triazolinethione) with aqueous acid to provide the poly(triazolinethione), and
 (d) isolating the resulting poly(triazolinethione).

The present invention provides an improved process for preparing poly(triazolinethiones) by cyclodehydration of poly(acylthiosemicarbazides), the improvement being utilization of moderately elevated temperatures and an aqueous alkaline solution to effect cyclization, followed by treatment with acid to form the poly(triazolinethione) structure.

In another aspect, poly(triazolinethiones) prepared by the novel process of the present invention are disclosed. The poly(triazolinethiones) of the invention remain soluble in polar organic solvents such as dimethylsulfoxide (DMSO), dimethylformamide (DMF), N-methylpyrrolidone (NMP), and dimethylacetamide (DMA), and can be efficiently fabricated into the final application configuration, such as a thin layer or coating, by conventional methods such as solution and melt processing.

DETAILED DESCRIPTION OF THE INVENTION

The present invention provides a novel process for the cyclodehydration of poly(acylthiosemicarbazides) to poly(triazolinethiones). The instant process provides a marked improvement over prior art thermal cyclodehydrations in that poly(triazolinethione) polymers that are soluble in polar ogranic solvents are the result. By soluble in polar organic solvents is meant that at least 0.1 weight percent dissolves in a solvent such as dimethylformamide, dimethylacetamide, dimethyl sulfoxide, or N-methylpyrrolidone at about 23° C. The polymers can contain in the range of 2 to 10,000, and preferably 5 to 5,000, triazolinethione units. In contrast, application of the thermal cyclodehydrative method disclosed by M. I. Shtil'man, et al., discussed above, often leads to crosslinking and insolubilization, which are not desirable because it is then impossible to either coat a solution of the poly(triazolinethione) or to thermally manipulate the polymer into the desired end-use configuration.

The novel process of the present invention consists of the following steps:

Step (a)

The poly(acylthiosemicarbazides), which are precursors to the desired poly(triazolinethiones), are known in the art and are conveniently prepared as outlined by M. I. Shtil'man, et al., *Polymer Sci. USSR*, 10, 2827 (1969). They are the reaction products of bis(isothiocyanates) (Formula I below) and bis(hydrazides) (Formula II below) as illustrated in Equation (3):

$$\left.\begin{array}{c}\text{SCN}-\text{X}-\text{NCS} \\ \text{I} \\ + \\ \text{H}_2\text{NNHC}-\text{Y}-\text{CNHNH}_2 \\ \phantom{\text{H}_2\text{NNHC}}\overset{\|}{\text{O}}\phantom{-\text{Y}-}\overset{\|}{\text{O}} \\ \text{II}\end{array}\right\}\longrightarrow \tag{3}$$

$$-\!\!\left[\text{NHNHC}-\text{Y}-\overset{\overset{\text{O}}{\|}}{\text{C}}\text{NHNHC}\overset{\overset{\text{S}}{\|}}{\text{NH}}-\text{X}-\overset{\overset{\text{S}}{\|}}{\text{NHC}}\right]\!\!-$$

wherein the bridging groups X and Y can be any divalent organic group such as alkylene groups having from 2 to 20 carbon atoms and arylene groups having from 6 to 20 carbon atoms and, optionally, can be interrupted by one to five catenary heteroatoms of oxygen, nitrogen, silicon, or sulfur (each heteroatom being separated from each other by one or more carbon atoms). Further, X and Y can optionally be substituted with groups that do not undergo reactions with the isothiocyanate group or be chemically altered by the mild alkaline cyclodehydrative conditions of the process. Suitable substituents include halo, ester, ether, silyl, nitro, and nitrile, with the hydrocarbyl groups of the substituents possessing from 1 to 4 carbon atoms.

Step (b)

This step involves the cyclodehydration of polymers which contain two or more acylthiosemicarbazide units, designated by Formula III in Equation (4). The cyclodehydration to form the polyanion (Formula IV), which is the conjugate base of the poly(triazolinethione), is accomplished at moderately elevated temperatures, i.e., 60° to 150° C., preferably 80° to 120° C., most preferably at 100° C., using a stoichiometric excess of an aqueous alkaline solution having a pH from 8 to 13, preferably from 11 to 12. The equation depicting this step is as follows:

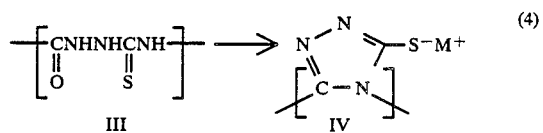

(4)

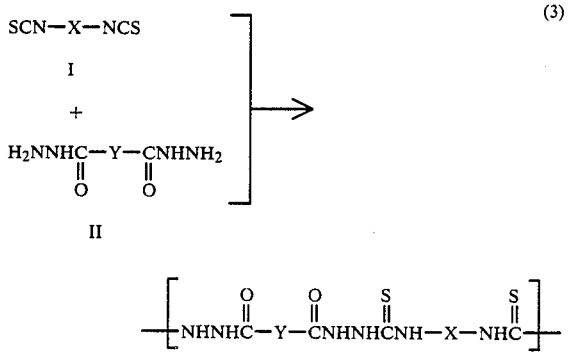

wherein M is a monovalent ion (e.g., an ammonium or an alkali metal ion such as Na+, K+, and Li+).

The length of time for the cyclodehydration to occur varies substantially depending on several factors including the relative concentration of the acylthiosemicarbazide units in the polymer, the elevated temperature utilized, and the pH of the aqueous alkaline solution. In most instances the reaction can be determined to be complete when the reacting polymer, i.e., the poly(acylthiosemicarbazide) dissolves in the aqueous alkaline solution, typically in 1 to 2 hours.

A wide variety of bases are suitable for use as aqueous alkaline solutions in the process of the invention including ammonium salts and alkali metal (e.g., lithium, sodium, and potassium) salts of carbonates, bicarbonates, phosphates, borates, acetates, and the like. The concentration of the base dissolved in water is not critical so long as it is in stoichiometric excess of the acylthiosemicarbazide units present. Usually, 1M solutions and volumes of 10 mL per gram of poly(acylthiosemicarbazide) are employed. A preferred cyclodehydrative solution is 1M sodium carbonate. Hydroxide may be utilized as well, but only at concentrations below about 0.1M. If the pH is greater than about 13, cyclodehydration still occurs but other hydroxide-sensitive linkages that may also be present in the polymer such as amide, ester, and the acylthiosemicarbazide itself undergo hydrolysis reactions causing an undesirable scission of the polymer mainchain.

Step (c)

This step involves conversion of the polyanion units (Formula V) into the poly(triazolinethione) structure (Formula VI in Equation (5)):

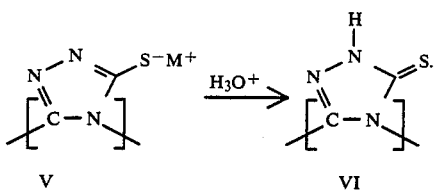

(5)

This transformation is accomplished by a stoichiometric excess of an aqueous acid of pH of 6 or less, above represented by the hydronium ion ($H_3O^+$). Suitable acids include hydrochloric, nitric, sulfuric, acetic, and many others employed in at least 1 molar concentration. This Step is particularly facile in the present invention and generally involves simply mixing the aqueous solution containing the polyanion and acid at room temperature.

Step (d)

The poly(triazolinethione) polymers containing the Formula VI units are insoluble in aqueous acid, precipitate, and can be isolated by simple filtration or decantation of the aqueous supernatant liquid.

Bis(isothiocyanates) which are useful in the preparation of the poly(acylthiosemicarbazides) used in Step (a) are known in the art and can readily be prepared by reaction of diamines with thiophosgene, as exemplified by M. Uher, et al., *Coll. Czech. Chem. Commun.*, 38, 289 (1973). Bis(hydrazides) too are well known in the art and can be obtained by reaction of hydrazine and a diester, and a representative procedure that we have utilized has been reported by T. W. Campbell, et al., *J. Appl. Polymer Sci.*, 2, 155 (1959).

Polymerization of the bis(isothiocyanate) with the bis(hydrazide) can conveniently be conducted by heating from 80° to 150° C., preferably from 100° to 140° C., over the course of 1 to 6 hours, preferably from 3 to 4 hours, equimolar quantities of the two monomers in N,N-dimethylformamide (DMF) or dimethyl sulfoxide (DMSO) solution. These two solvents are generally preferred because the monomers and resultant polymers are soluble therein, which provides a homogeneous reaction mixture over the course of polymerization. After the reaction period, the DMF or DMSO solution is cooled to room temperature and poured into approximately 10-fold volumes of water. The resultant precipitated poly(acylthiosemicarbazide) having 2 to 10,000 acylthiosemicarbazide units, preferably 5 to 5,000 such units, is filtered and washed with a non-solvent such as ether or methanol. The polymer can be dried at this point, but drying is not necessary before transformation to the poly(triazolinethione) by the novel process of the invention.

It is further contemplated as being within the scope of the present invention that various random copolymers can be prepared in which other kinds of functional groups are introduced in the polymer structure that are inert to the process conditions of our invention. Copolymerization, as is apparent to one possessing skill in the art, may be desirable in certain applications to alter specific polymer properties, e.g., toughness, solubility, melt viscosity, and conformability, or simply to vary the concentration of the triazolinethione units within the copolymer. The comonomers can be copolymerized in any proportion with the bis(isothiocyanate) and the bis(hydrazide). Suitable comonomers that may be employed are those which are reactive, and hence copolymerizable, either with the bis(isothiocyanate) such as diamines and diols or with the bis(hydrazide) such as diesters, diisocyanates, bis(azlactones), bis(epoxides), diacids, and diacid chlorides. Typically, these comonomers can simply be added to replace a portion of either the bis(isothiocyanate) or the bis(hydrazide) reactant charge.

Representative examples of useful comonomers include:

diamines:
ethylenediamine, 1,6-hexanediamine, m-xylylenediamine, 1,4-diaminocyclohexane, dimerdiamine, 1,12-dodecanediamine, p-phenylenediamine, and the like;

diols:
ethyleneglycol, 1,2-or 1,3-propyleneglycol, 1,4-butanediol, 1,6-hexanediol, diethyleneglycol, triethyleneglycol, 1,4-cyclohexanedimethanol; polyethyleneglycol, polytetramethyleneglycol, and the like;

diacids (or their corresponding acid chlorides or lower alkyl ($C_1$ or $C_2$) esters):
adipic, azelaic, sebacic, dimer, terephthalic, and isophthalic acids, and the like;

diisocyanates:
1,6-hexanediisocyanate, toluene diisocyanate, diphenylmethanediisocyanate, isophoronediisocyanate, and the like;

epoxides:
bisphenol-A-diglycidylether and the like;

bis(azlactones):
compounds of the formula

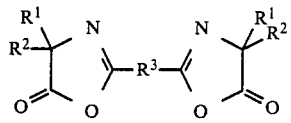

wherein
$R^1$ and $R^2$ independently represent an alkyl group having 1 to 12 carbon atoms, an aryl group having 6 to 12 carbon atoms, or $R^1$ and $R^2$ taken together with the carbon atom to which they are attached form a 5- to 12-membered carbocyclic ring;

$R^3$ is a divalent organic group having a molecular weight up to 20,000, preferably selected from a hydrocarbyl group (i.e., an alkylene group having 2 to 20 carbon atoms and an arylene group having 6 to 20 carbon atoms and optionally can be interrupted by one to five catenary heteroatoms of oxygen, nitrogen, and silicon or sulfur), polyoxyalkylene, polyester, polyolefin, polyacrylate, and polysiloxane groups that can optionally all be further substituted by at least one non-nucleophilic group such as cyano, halo, ester, ether, keto, nitro, silyl, or sulfide (the carbon-containing groups having up to 10 carbon atoms);

these compounds and their preparation being disclosed in Assignee's copending patent application U.S. Ser. No. 681,553, filed Dec. 13, 1984, and incorporated herein by reference; and a class of bis(azlactones) that can be prepared by a Michael-type addition of an amino or thiol group-substituted nucleophilic compound to an alkenyl azlactone and are disclosed in U.S. Pat. No. 4,485,236, and incorporated herein by reference.

Typical examples of copolymeric units that can be incorporated into copolymers containing triazolinethione units of the invention include:

| Copolymeric unit | Name | Derived by copolymerization from |
|---|---|---|
| $\overset{S}{\underset{\|}{-NHCNH-}}$ | thiourea | diamine |
| $\overset{S}{\underset{\|}{-NHCO-}}$ | thiourethane | diol |
| $\overset{O}{\underset{\|}{-CNHNHC-}}\overset{O}{\underset{\|}{}}$ | acylhydrazide | diacid derivative |
| $\overset{O}{\underset{\|}{-NHCNHNHC-}}\overset{O}{\underset{\|}{}}$ | acylsemicarbazide | diisocyanate |

The triazolinethione-containing polymers of the invention are useful as non-migrating components in photosensitive materials. They can have utility to enhance contrast, as anti-bronzing agents, as stabilizers for developed images, and as antihalation agents. The triazolinethione-containing polymers can be included in emulsions or with other resinous materials or can be coated out of polar organic solvents by methods known in the art such as roll-coating, dip-coating, bar-coating, knife-coating, etc.

Having described our invention in general terms, it is now further described by specific examples of preparations of various poly(triazolinethiones) by utilization of our novel process. The particular materials and amounts recited in the examples, however, as well as other details and conditions, should not be construed to unduly limit the invention.

EXAMPLE 1

A. Polymerization of 1,6-bis(isothiocyanato)hexane and m-phenylene dihydrazide

Step (a)

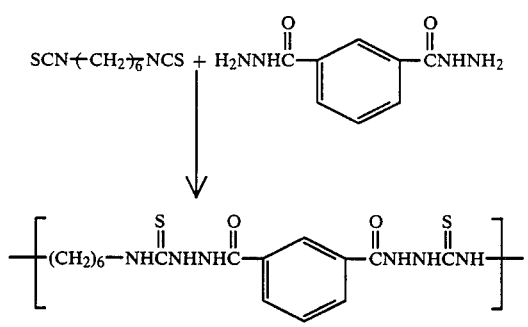

In a 250 mL, round-bottomed flask equipped with an argon inlet, condenser, and mechanical stirrer were placed 1,6-bis(isothiocyanato)hexane (4.00 g; 20 mMol), m-phenylene dihydrazide (3.88 g; 20 mMol), and DMSO (100 mL). The solution was heated at 100° C. under an argon atmosphere for 4 hours. The solution was cooled to room temperature and poured with stirring into 1 L of water. The resulting white solid was collected by filtration and washed with methanol. Yield: 7.42 grams. Spectroscopic analysis confirmed the presence of the desired poly(acylthiosemicarbazide).

Preparation of the poly(triazolinethione) derived from 1,6-bis(isothiocyanato)hexane and m-phenylene dihydrazide Step (b)

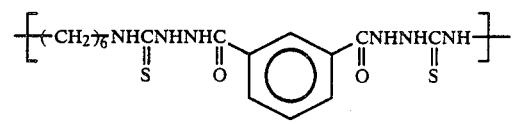

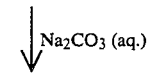

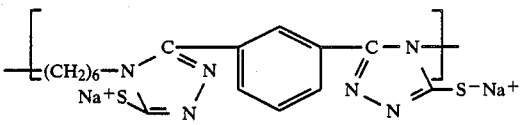

In a 100 mL, round-bottomed flask were placed the above prepared poly(acylthiosemicarbazide) (5.0 grams) and 1M aqueous sodium carbonate (50 mL). The initial mixture was refluxed for 1 hour, during which time the white solid dissolved to form a colorless solution of the polyanion.

Steps (c) and (d)

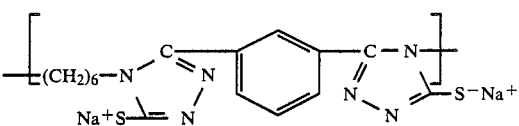

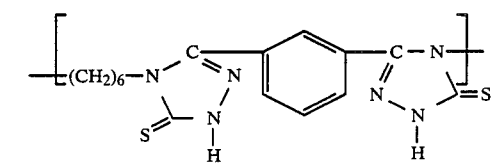

The aqueous alkaline solution from Step (b) was poured into a beaker containing water (200 mL), and concentrated hydrochloric acid was added dropwise with stirring until the pH was less than 2. The precipitated polymer was filtered, washed with water and methanol, and dried overnight at 50° C. under vacuum (less than 1 Torr.). Yield: 4.2 grams. Spectroscopic analysis confirmed the presence of the desired poly(triazolinethione).

The inherent viscosity ($\eta$) of the polymer at 30° C. in DMF (0.50 g/100 mL) was 0.29 dL/g.

EXAMPLES 2–9

Using the procedure of Example 1, the various polymers shown in TABLE I were prepared.

TABLE I

[Structure shown at top of table]

| Example | X | Y | η(a) |
|---------|---|---|------|
| 2 | (CH₂)₆ | p-C₆H₄ | 0.27 |
| 3 | " | (CH₂)₄ | 0.31 |
| 4 | " | CH₂OCH₂ | 0.11 |
| 5 | (CH₂)₃ | m-C₆H₄ | 0.04 |
| 6 | O(p-C₆H₄)₂ | " | 0.07 |
| 7 | p-C₆H₄ | " | 0.15 |
| 8 | [cyclohexane-CH₂ structure] | " | 0.22 |
| 9 | [cyclohexane-(CH₂)₂ structure] | " | 0.16 |

(a) All inherent viscosities (η, in dL/g) were measured in DMF as in Example 1.

COMPARATIVE EXAMPLE 1

This Example teaches that thermal cyclodehydration as disclosed by M. I. Shtil'man, et al., *Polymer Sci. USSR*, 10, 2827 (1969) often leads to insoluble poly(triazolinethiones).

The poly(acylthiosemicarbazide) precursor to Example 3 (2.0 grams) was placed in a round-bottomed flask and heated to 200° C. at less than 1 Torr. for 1 hour. The resulting poly(triazolinethione) was not soluble in DMF.

COMPARATIVE EXAMPLE 2

This Example teaches that the pH should be less than about 14 in order to prevent deleterious, hydrolysis side reactions.

When Step (b) of Example 1 was conducted using 1M sodium hydroxide (pH=14) instead of 1M sodium carbonate with the poly(acylthiosemicarbazide) precursor to Example 1, no polymer was isolated in Step (d).

Various modifications and alterations of this invention will become apparent to those skilled in the art without departing from the scope and spirit of this invention, and it should be understood that this invention is not to be unduly limited to the illustrative embodiments set forth herein.

We claim:

1. A copolymer comprising at least one triazolinethione unit of the formula

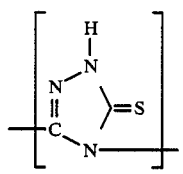

and copolymerizable comonomeric units, said copolymer being non-migratable and uncrosslinked, and at least 0.1 weight percent of said copolymer being capable of dissolving in dimethylformamide, dimethylacetamide, dimethyl sulfoxide, or N-methylpyrrolidone at 23° C.

2. The copolymer according to claim 1 wherein said copolymerizable comonomer is selected from the group consisting of a diamine, diol, diester, diisocyanate, bis(azlactone), bis(epoxide), diacid, or diacid chloride.

3. The copolymer according to claim 1 wherein said copolymerizable comonomer is a diamine or diol.

4. A copolymer comprising at least one triazolinethione unit having the formula

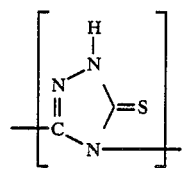

or its tautomeric form, and copolymerizable comonomeric units, said copolymer being non-migratable and uncrosslinked, and at least 0.1 weight percent of said copolymer being capable of dissolving in dimethylformamide, dimethylacetamide, dimethyl sulfoxide, or N-methylpyrrolidone at 23° C.

5. The copolymer according to claim 4 wherein said copolymerizable comonomer is selected from the group consisting of a diamine, diol, diester, diisocyanate, bis(azlactone), bis(epoxide), diacid, and diacid chloride.

6. A copolymer comprising at least one triazolinethione unit of the formula

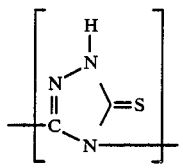

and copolymerizable comonomeric units are derived from comonomers selected from the group consisting of diester, diisocyanate, bis(azlactone), bis(epoxide), diacid, or diacide chloride, said copolymer being non-migratable and uncrosslinked, and at least 0.1 weight percent of said copolymer being capable of dissolving in dimethylformamide, dimethylacetamide, dimethyl sulfoxide, and N-methylpyrrolidone at 23° C.

7. A process for preparing a copolymer comprising the steps:
(a) reacting a bis(hydrazide) compound with a bis(isothiocyanate) compound and a comonomer copolymerizable with at least one of said bis(hydrazide) compound or said bis(isothiocyanate) to provide a co(poly)acylthiosemicarbazide,
(b) cyclodehydrating said copoly(acylthiosemicarbazide) by subjecting it to an elevated temperature in the presence of an aqueous alkaline solution to form a polyanion of a copoly(triazolinethione),
(c) treating said polyanion of said copoly(triazolinethione) with aqueous acid solution to provide a copoly(triazolinethione), and
(d) isolating the resulting copoly(triazolinethione), said copoly(triazolinethione) being non-migratable.

8. The process according to claim 7 wherein said copolymerizable comonomer is selected from the group consisting of a diamine, diol, diester, diisocyanate, bis(azlactone), bis(epoxide), diacid, and diacid chloride.

9. A process for preparing a copoly(triazolinethione) comprising the steps:

(a) providing a copoly(acylthiosemicarbazide) having units of the formula

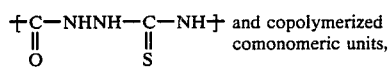 and copolymerized comonomeric units, (b) cyclodehydrating said copoly(acylthiosemicarbazide) by subjecting it to a temperature in the range of 60°–150° C. in the presence of an aqueous alkaline solution having a pH in the range of 8 to 13 to form a polyanion of a copoly(triazolinethione) having units of the formula

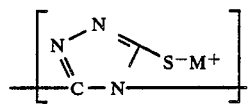

wherein M is a monovalent ion and copolymerized comonomeric units, (c) treating said polyanion of said copoly(triazolinethione) with an aqueous acid solution having a pH of 6 or less to provide units of said copoly(triazolinethione) having the formula

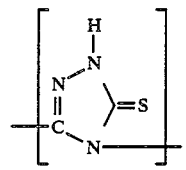

and copolymerized comonomeric units, (d) isolating said resulting copoly(triazolinethione), said copoly(triazolinethione) being non-migratable.

10. The process according to claim 9 wherein said copoly(acylthiosemicarbazide) is prepared by reacting a bis(hydrazide) compound with a bis(isothiocyanate) compound and a comonomer copolymerizable with at least one of said bis(hydrazide) compound or said bis(isothiocyanate) compound.

11. The process according to claim 10 wherein said copolymerizable comonomer is selected from the group consisting of a diamine, diol, diester, diisocyanate, bis(azlactone), bis(epoxide), diacid, and diacid chloride.

* * * * *